United States Patent Office 2,907,101
Patented Oct. 6, 1959

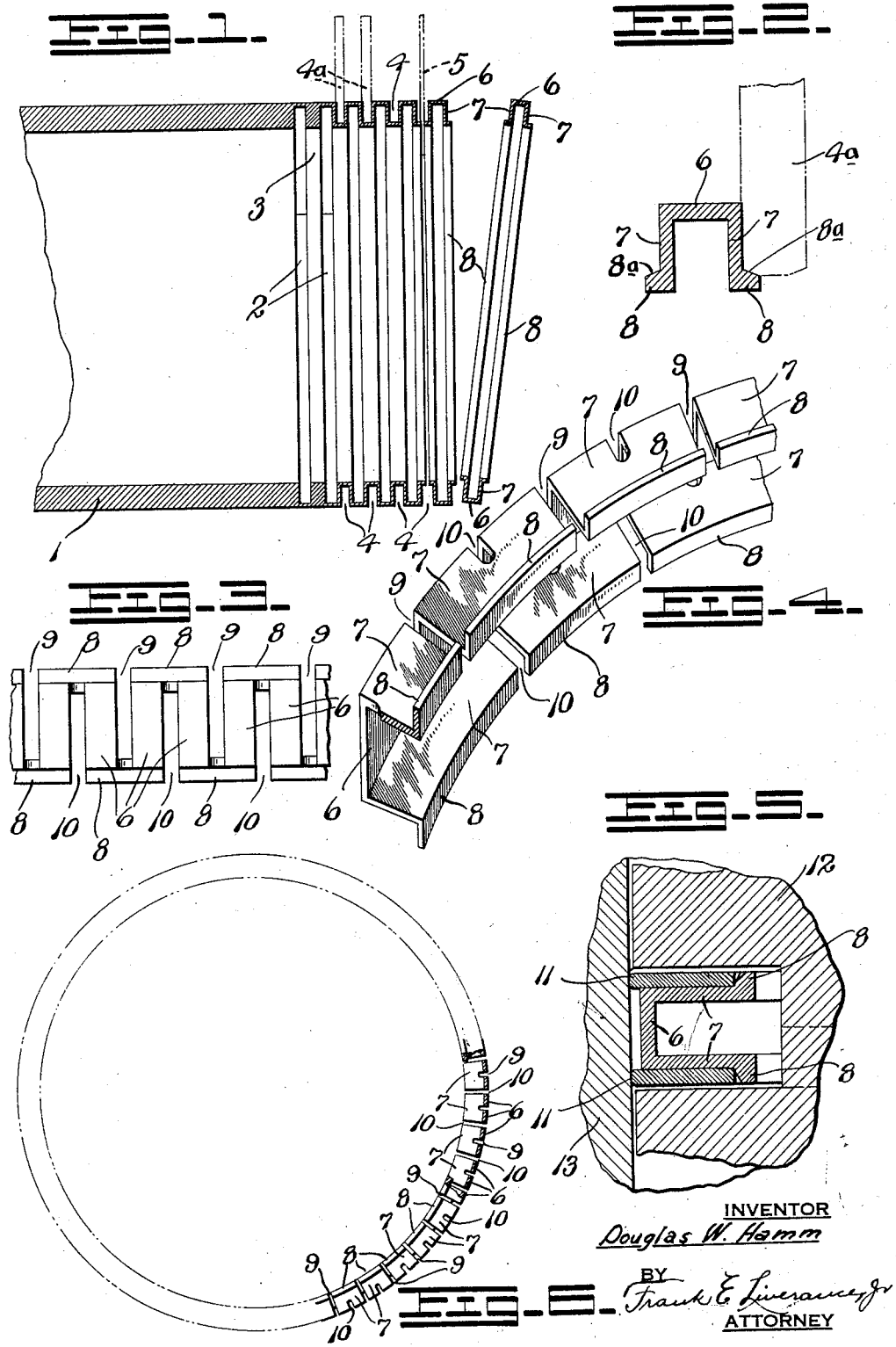

2,907,101

METHOD OF PRODUCING A CONTINUOUS SPACER AND EXPANDER FOR PISTON RINGS

Douglas W. Hamm, Muskegon, Mich., assignor to Muskegon Piston Ring Company, Muskegon, Mich., a corporation of Michigan Application December 30, 1954, Serial No. 478,599

2 Claims. (Cl. 29—156.62)

The present invention relates to a continuous unparted spacer and expander for piston rings, used to space circular parted thin metallic rails which are forced at their outer edges against the wall of a cylinder, such combined spacer and expander and rails used therewith being installed in the lower oil groove of a piston of an internal combustion engine.

With my invention the combined spacer and expander in one piece, of circular form, and with no division or parting in it is foolproof when installed. An incorrect assembly of the spacer and expander with the rails is impossible, there being no danger of an incorrect assembly which occurs with piston ring structures of a similar type where the spacer and expander are parted at one side, and reliance must be placed upon the ends coming into exact abutting arrangement when installation is made. The spacer and expander of my invention is produced by a novel method attaining a one-piece continuous spacer and expander member which initially, having an outside diameter greater than the diameter or circumference at which it will be used in an internal combustion engine, is circumferentially compressed or contracted to such lesser diameter and circumference. This causes a generation of forces in the contracted or compressed spacer and expander which provide continuous, uniform, outward radial pressure upon the rails maintaining them at their outer edges with a uniform unit pressure of desired degree against the cylinder walls.

The novel spacer and expander of my invention and the novel method by which it is produced may be understood from the following description, taken in connection with the accompanying drawing, in which, Fig. 1 is a longitudinal section through a tube of preselected inside and outside diameters and of a preselected thickness, and also showing the alternate interior and exterior continuous grooves cut therein in the first step of the process of providing the expander and spacer of my invention, and further showing the second step in which a successive series of continuous channel members with inwardly extending flanges terminating in laterally extending lips are produced.

Fig. 2 is an enlarged transverse section through one of such channel ring members showing the manner in which an inclination to the lips at the inner ends of the flanges is produced, for causing the rails used therewith to seal against the upper and lower sides of a piston ring groove.

Fig. 3 is a fragmentary elevation of the finished or completed spacer and expander of my invention.

Fig. 4 is a fragmentary perspective view of a portion of such expander and spacer after it has been finished by the final step of operation in making it.

Fig. 5 is a fragmentary vertical section through a piston at the oil ring groove therein, and the adjacent wall of a cylinder in which installed, the expander and spacer of my invention associated with rails being shown in transverse vertical section in such oil ring groove, and Fig. 6 is a fragmentary plan view, with parts broken away and shown in section, of the combined spacer and expander ring member of my invention.

Like reference characters refer to like parts in the different figures of the drawing.

In producing the expander and spacer of my invention, a tube 1 of suitable metal, generally of steel, which has a predetermined thickness and also is of selected internal and external diameters, is machined at its inner side to provide a successive series of spaced annular interior grooves 2 separated by inwardly extending continuous annular tongues 3. Such tongues 3 are machined so as to cut continuous exterior grooves 4 therein, using suitable cutting tools 4a. There is thus produced a continuous cylindrical wall of a corrugated nature having successive alternate exteriorly and interiorly extending channels, having exterior webs 6 and inwardly extending flanges 7 spaced from each other and inner webs connecting the flanges. In the succeeding step of the process, the inner webs are divided so as to cut from the tube, successive circular rings of channel form, the inwardly extending flanges terminating in oppositely extending continuous lips 8. This is done by splitting the inner webs substantially midway between the inwardly extending flanges 7 by a narrow cutting tool indicated at 5 in Fig. 1, which cuts a continuous slot of less width than that of the inner webs. Preferably the cutting tool 4a which is used to cut the grooves 4 will be shaped at its inner end, as in Fig. 2, so that the outer faces of the lips 8 are disposed at an obtuse angle to the planes of the adjacent faces of the flanges 7, as at 8a.

The continuous rings thus provided are further processed by milling or otherwise machining alternate slots 9 and 10 (Fig. 4) which are staggered with relation to each other. The slots 9 are cut radially through the upper flange 7 and the lips connected therewith, extend downwardly the full dimension of the web 6 and partly into the lower flange 7. The alternate slots 10, each located between and staggered with respect to the next two adjacent slots 9, are cut through the lower flange 7 and its inner lip 8, upwardly through the web 6 and partly through the upper flange 7 toward the lip 8 thereon. This divides the channel ring member into a large plurality of successive segments, the upper flange 7 having segments between adjacent slots 9 and the lower flange 7 between adjacent slots 10.

Such construction of ring member is circumferentially compressible or contractable to a smaller diameter or expansible to a larger diameter and yieldingly resists contraction or expansion.

The ring member thus produced is a spacer and expander for metal rails 11, usually of steel, which are usually .020" to .025" in thickness, one located over the upper flange 7 and the segments provided thereby with its inner edge against the upwardly extending lip 8, and a second rail below the lower flange 7 and the segments provided thereby, and the downwardly extending lips 8. When installed in the oil ring groove of a piston 12 and placed within a cylinder 13, the closing of the partings in the rails 11 will force them at their inner curved edges against the lips 8, causing circumferential contraction of the spacer and expander. Thus there is generated radial forces which act to radially press the rails 11 outwardly and the outer curved bearing edges thereof against the cylinder wall.

With the inclined surfaces at 8a on the lips 8, the rails are forced into sealing engagement with the opposed upper and lower sides of the piston ring groove in which installed. In Fig. 5 the spaces shown between the piston ring and upper and lower sides of the groove are exaggerated, as in practice, the clearance between the rails and sides of the ring groove is very small, not over one or two thousandths of an inch.

With the construction of spacer and expander described, made in the manner set forth, an advantageous structure is obtained insuring against incorrect assembly as previously pointed out, obtaining uniform outward pressure distribution throughout the circumference of the ring. The expander and spacer ring member may be readily machined automatically so that it is produced at low cost. Attainment of a sealing pressure of the rails against the upper and lower sides of the piston ring groove in which installed is very easily obtained.

The invention is defined in the appended claims and is to be considered comprehensive of all forms of structure coming within their scope.

I claim:

1. Method of producing piston ring rail spacer and expander members which comprises, the steps of machining a metal tube of preselected inner and outer diameters by cutting successive spaced alternate inner and outer grooves from the inside of the tube outwardly and from the outside of the tube inwardly, cutting rings in succession therefrom at the bottoms of the inwardly extending grooves, and slotting said rings at spaced intervals in the opposed sides of said rings, alternately from opposite edges thereof and in staggered relation, said slotting of the sides of a ring extending each from the free edge thereof to the opposite side, and ending short of the free edge of said opposite side.

2. The method consisting of the steps recited in claim 1, said bottoms of said inwardly extending grooves having cut lengthwise therein, a central continuous slot midway between the side edges of each groove, the slots cut being of less width than the widths of said grooves.

References Cited in the file of this patent

UNITED STATES PATENTS

| | | |
|---|---|---|
| 1,433,937 | Clews et al. | Oct. 31, 1922 |
| 1,951,397 | Covert | Mar. 20, 1934 |
| 1,987,784 | McDonald | Jan. 15, 1935 |
| 1,997,534 | Oubridge | Apr. 9, 1935 |
| 2,484,288 | Hamm | Oct. 11, 1949 |
| 2,695,825 | Estey | Nov. 30, 1954 |

FOREIGN PATENTS

| | | |
|---|---|---|
| 792,362 | France | Dec. 30, 1935 |